(12) United States Patent
Hsu et al.

(10) Patent No.: US 7,002,775 B2
(45) Date of Patent: Feb. 21, 2006

(54) HEAD FOR PERPENDICULAR MAGNETIC RECORDING WITH A SHIELD STRUCTURE CONNECTED TO THE RETURN POLE PIECE

(75) Inventors: Yimin Hsu, Sunnyvale, CA (US); Quang Le, San Jose, CA (US); James Lamar Nix, Gilroy, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 191 days.

(21) Appl. No.: 10/676,742

(22) Filed: Sep. 30, 2003

(65) Prior Publication Data

US 2005/0068678 A1 Mar. 31, 2005

(51) Int. Cl.
*G11B 5/147* (2006.01)
(52) U.S. Cl. ...................................................... 360/125
(58) Field of Classification Search ................. None
See application file for complete search history.

(56) References Cited

U.S. PATENT DOCUMENTS

| | | | |
|---|---|---|---|
| 4,317,148 A | * | 2/1982 | Chi ............................. 360/125 |
| 4,731,157 A | | 3/1988 | Lazzari |
| 4,935,832 A | | 6/1990 | Das et al. |
| RE33,949 E | | 6/1992 | Mallary et al. |
| 5,196,976 A | | 3/1993 | Lazzari |
| 5,408,373 A | | 4/1995 | Bajorek |
| 5,550,691 A | | 8/1996 | Hamilton |
| 6,531,202 B1 | | 3/2003 | Litvinov et al. |
| 6,728,065 B1 | * | 4/2004 | Batra et al. .................. 360/126 |
| 6,842,313 B1 | * | 1/2005 | Mallary ....................... 360/126 |
| 6,888,700 B1 | * | 5/2005 | Litvinov et al. ............ 360/125 |
| 2002/0034043 A1 | | 3/2002 | Okada et al. |
| 2002/0071208 A1 | | 6/2002 | Batra et al. |
| 2002/0176214 A1 | | 11/2002 | Shukh et al. |
| 2003/0043513 A1 | | 3/2003 | Lin |
| 2003/0151850 A1 | | 8/2003 | Nakamura et al. |

OTHER PUBLICATIONS

M.Mallory, et al. "One Terabit per Square Inch Perpendicular Recording Conceptual Design," IEEE Transactions on Magnetics, vol. 38, No. 4, Jul. 2002, pp. 1719ff.
Kanai, et al., "Numerical Analysis of Narrow-track Single-pole-type Head with side Shields for 1 Tb/in2 recording"; by; J. Applied Physics; vol. 93, No. 10; May 15, 2003.

* cited by examiner

*Primary Examiner*—Robert S. Tupper
(74) *Attorney, Agent, or Firm*—G. Marlin Knight

(57) ABSTRACT

An embodiment of the invention is a head for perpendicular recording that has a trailing shield and side shields that are connected to the return pole piece by two studs of ferromagnetic material. The studs extend parallel to the track direction and are located a sufficient distance away from the main pole piece to reduce the flux flow from the main pole piece to the studs. Optionally the studs can be recessed behind the air-bearing surface. The preferred embodiment of the invention is a magnetic transducer with separated read and write heads for perpendicular recording.

16 Claims, 5 Drawing Sheets

HEAD FOR PERPENDICULAR MAGNETIC RECORDING WITH A SHIELD STRUCTURE CONNECTED TO THE RETURN POLE PIECE

FIELD OF THE INVENTION

The invention relates to thin film magnetic transducers for perpendicular recording and more particularly to the inductive write head portion of the transducer and even more particularly to the design of the pole pieces for the inductive write head.

BACKGROUND OF THE INVENTION

In a typical prior art magnetic disk recording system a slider containing magnetic transducers for reading and writing magnetic transitions flies above the disk while it is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive.

In a disk drive using perpendicular recording the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole-of the recording head perpendicularly through the hard magnetic recording layer, then into the plane of the soft underlayer and back to the return pole in the recording head. The shape and size of the main pole and any shields are the primary factors in determining the track width.

In U.S. Pat. No. RE33,949 to Mallary, et al. a head for perpendicular recording is described which includes a "downstream shield" which is separated from the write pole by a small gap. The arrangement is said to intercept most of the downstream fringing flux by the flux return section so that the flux return section acts as a magnetic shield. The interception of the downstream fringing flux by the magnetic shield reduces the undesirable effect of reversing, or weakening, a previously recorded bit of information. The air-bearing surface (ABS) face of the shield is designed to be many times as large as the face of the main (write) pole piece so that the density of the flux from the main pole tip is sufficient to effect a vertical recording while the density of the flux passing into the downstream magnetic shield is low and a previously recorded pattern is not reversed.

FIG. 1 illustrates a prior art head 26 for perpendicular recording and the associated media 27. The head is described in an article by M. Mallary, A. Torobi and M. Benakli published in IEEE Transactions on Magnetics, vol. 38, no.4, July 2002. The head 26 has a trailing shield pole 33 and side shields (not shown). The magnetoresistive sensor 35 is flanked by shields 36, 37. This head is workable with a leading magnetoresistive head structure because two pancake coils 35A, 35B are used to ensure that the read head shield 36 is at the same magnetomotive potential as the trailing shield pole 33 and the soft underlayer 29 of the medium 27. The flux paths are illustrated by lines 39 which show the write pole originating the flux at the ABS which then is divided between the trailing shield pole 33 and the read head shield 36 after passing through the hard ferromagnetic recording layer 28. A disadvantage of this design is that it requires two pancake coils. It also requires a relatively thick return pole which will have to be made of high moment material for the desirable high write field capability, and a very narrow throat height for that element. The figure also shows this design will result in write disturbance of the read shields.

A perpendicular recording head with side shields is discussed in "Numerical Analysis of Narrow-track Single-pole-type Head with side Shields for 1 Tb/in2 recording"; by Kanai, Mohammed, Matsubara, Muraoka and Nakamura; J. Applied Physics; vol. 93, no. 10; May 15, 2003. The two side shields each begin at the ABS and extend a small distance (less than the throat height) into the head. The authors report that finite element modeling of a head with the side shields showed a significant improvement by reducing the off-track field which would allow a narrower track to be written. In a top view, perpendicular to the ABS, the shields taper as they get closer to the main pole piece. Alternatively stated, the side shields are thicker the further they are from the center of the track. The purpose of the tapered shields is to increase the on-track field strength over what was obtained with a constant shield cross-section.

Perpendicular magnetic recording is considered to be superior to longitudinal magnetic recording for ultra-high density magnetic recording. The increase demand for higher areal density has correspondingly led to increase demand to explore ways to reduce the width of the write pole piece, increase the write field strength, and improve the write field gradient. Experimental evidence and modeling have shown that a trailing shield single pole writer (SPT) design achieves a 4–5 dB media signal to noise advantage over writing with the trailing edge of an unshielded pole, increase in dHy/dx of the head field, reduce partial erasure, and improve saturation. These features improve transition sharpness (linear resolution) and permit higher coercive field media (improved stability).

SUMMARY OF THE INVENTION

An embodiment of the invention is a head for perpendicular recording that has a trailing shield and side shields that are connected to the return pole piece by two studs of ferromagnetic material. The studs extend parallel to the track direction and are located a sufficient distance away from the main pole piece to reduce the flux flow from the main pole piece to the studs. Optionally the studs can be recessed behind the air-bearing surface. The preferred embodiment of the invention is a magnetic transducer with separated read and write heads for perpendicular recording.

DETAILED DESCRIPTION OF THE INVENTION AND THE PREFERRED EMBODIMENTS

Figure 1:
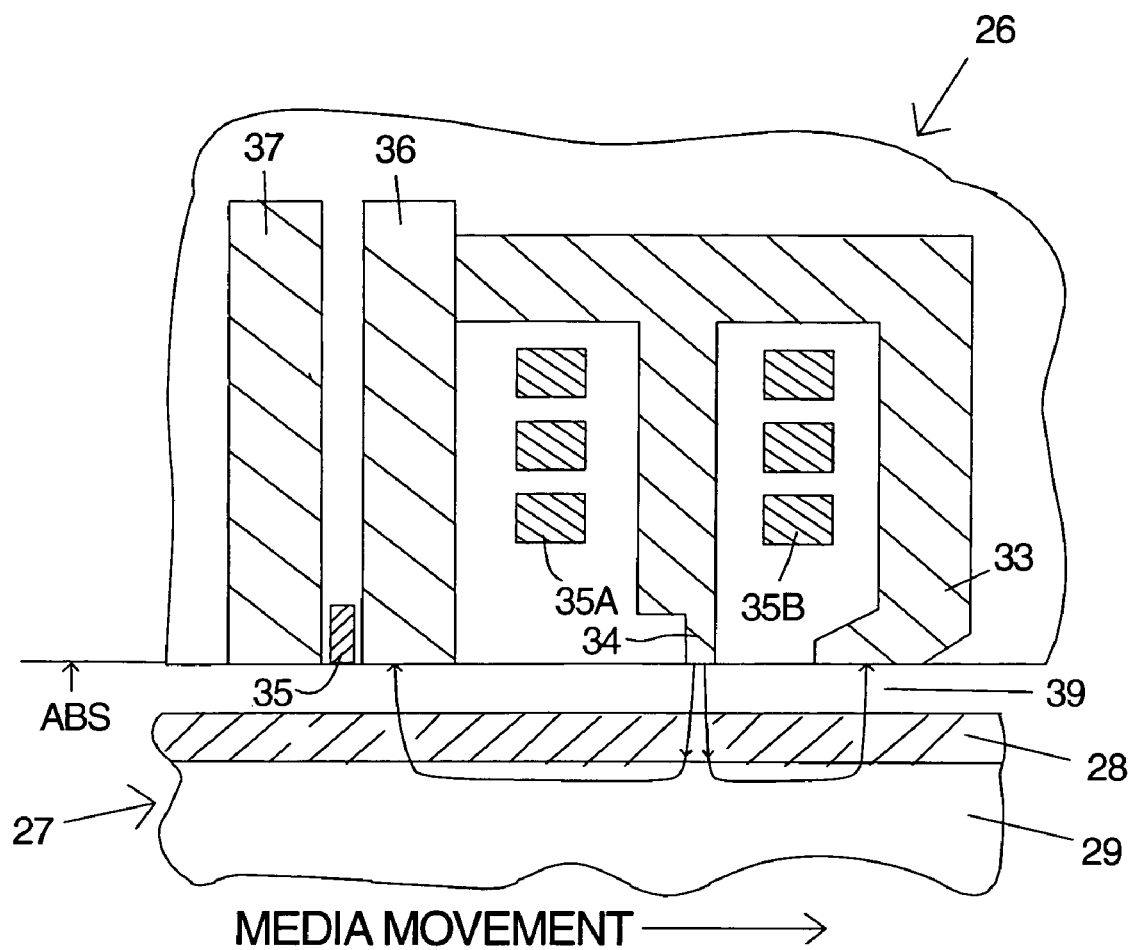
FIG. 1 is a symbolic illustration of a section of a prior art recording head and media for perpendicular recording taken perpendicular to the air-bearing surface.
Figure 2:
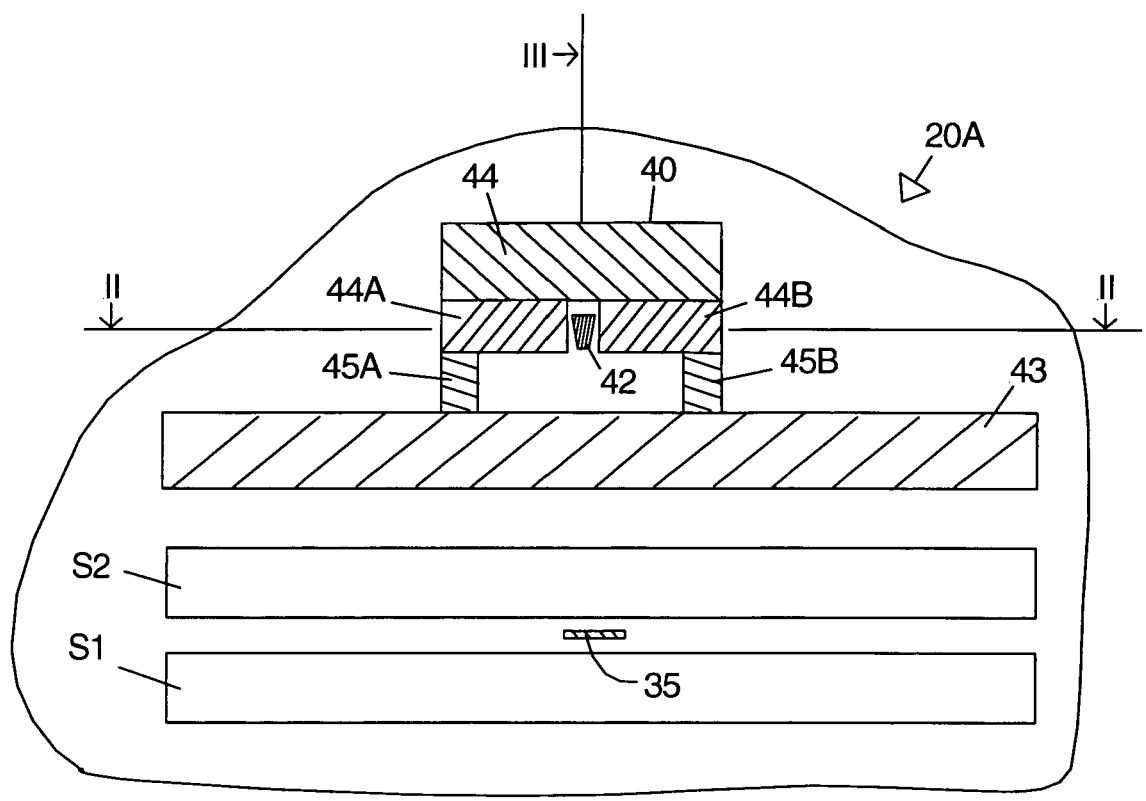
FIG. 2 is a symbolic illustration of the ABS of a recording head according to a first embodiment of the invention.

FIG. 2 is a symbolic illustration of the ABS of a head 20A according to a first embodiment of the invention. This figure and the others included herein are not to scale, in part because the smaller components and spacings would be unclear. Places where the relative sizes and dimensions are significant will be noted if not known to those skilled in the art. The ABS is shown without the thin film protective overcoat which would normally be present in a production head. The term ABS as used herein means the plane as shown in the drawings without regard to whether an overcoat is present. The read sensor 35 and its shields S1, S2 can be located on either side of the write head, i.e., the read head can be fabricated first or last. The ferromagnetic yoke includes main (write) pole piece 42 and return pole piece 43. The shield structure 40 includes the trailing shield 44 and the side shields 44A, 44B. The movement of the magnetic recording medium is from the return pole piece 43 to the main pole piece 42 to the trailing shield, hence the label "trailing." The connecting studs 45A, 45B extend from the side shields 44A, 44B to the return pole piece 43. The points where the connecting studs attach to the return pole piece are symmetrically disposed around the track line of the head which is a center line on the ABS marked by the line III. The connecting studs extend from the outer edges of the side shields 44A, 44B down to the return pole piece. In this embodiment the distance between the connecting studs is approximately 25% of the length of the return pole piece in the cross-track direction. Although the invention is not limited to this configuration, the shield structure 40 does not extend beyond the connecting studs which in this embodiment means that the shield structure is relatively narrow in relation to the return pole piece.

Figure 8:
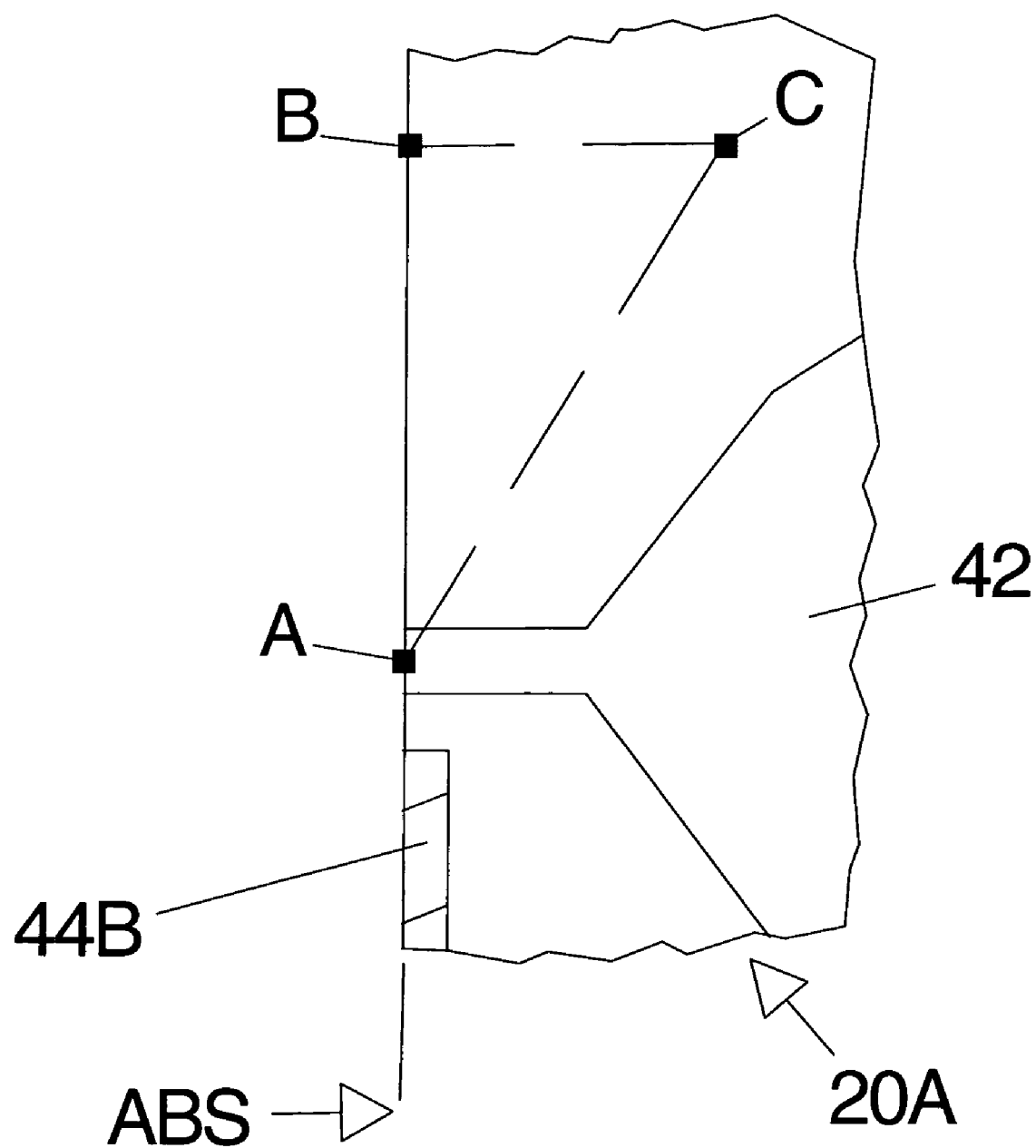
FIG. 8 is a symbolic illustration of a design rule for placement of the connecting studs from the wafer layout view at the selected level.

Although the trailing shield 44, the side shields, the connecting studs 45A, 45B and the return pole piece are shown as distinct elements in figures, they are preferably made from the same ferromagnetic material and, therefore, will seamlessly blend together. The connecting studs 45A, 45B as shown are rectangular and are positioned substantially farther away from the main pole piece than the side shields. Selection of the location for the studs will be described using FIG. 8 which is the same view as used in FIG. 3. Each stud is preferably located in a triangle (ABC) with first corner A at the center of the main pole piece tip at the ABS. The second corner B is located at the ABS approximately 10–50% of the width of the return pole piece away from the center of the pole A. The third corner C is located at the same cross-track position to form a right angle CBA with the length of BC being selected so that the included angle BAC is less than 40 degrees. This design rule keeps the reluctance between the stud (including connection between trailing shield and the stud) and the main pole piece high enough to not excessively reduce the write field or saturate the stud. The coil does not extend to the ABS and is not shown in this view, but it is disposed above the return pole piece 43 and behind the connecting studs 45A, 45B.

Figure 3:
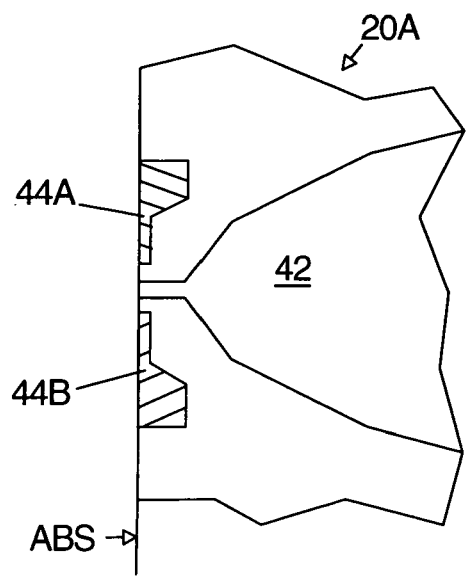
FIG. 3 is a symbolic illustration of a section of the recording head taken along line II in FIG. 2.

FIG. 3 is a symbolic illustration of a section of the recording head 20A taken along line II in FIG. 2 which shows the wafer layout view at the selected level. Only a small tip area of the main pole piece 42 appears at the ABS. The point where the main pole piece 42 begins to widen is called the flare point. Near the main pole piece tip the thickness of the side shields 44A, 44B measured orthogonal to the ABS, i.e., into the head, is preferably less than the distance to the flare point. Farther away from the main pole piece tip the side shields are preferably much thicker. In the embodiment shown in FIG. 3, the outer portions (away from the tip) of the side shields are trapezoidal in shape, but no particular shape is required under the invention. The trailing shield 44 is not shown in this view, but will preferably have the same thickness profile as the side shields.

Figure 4:
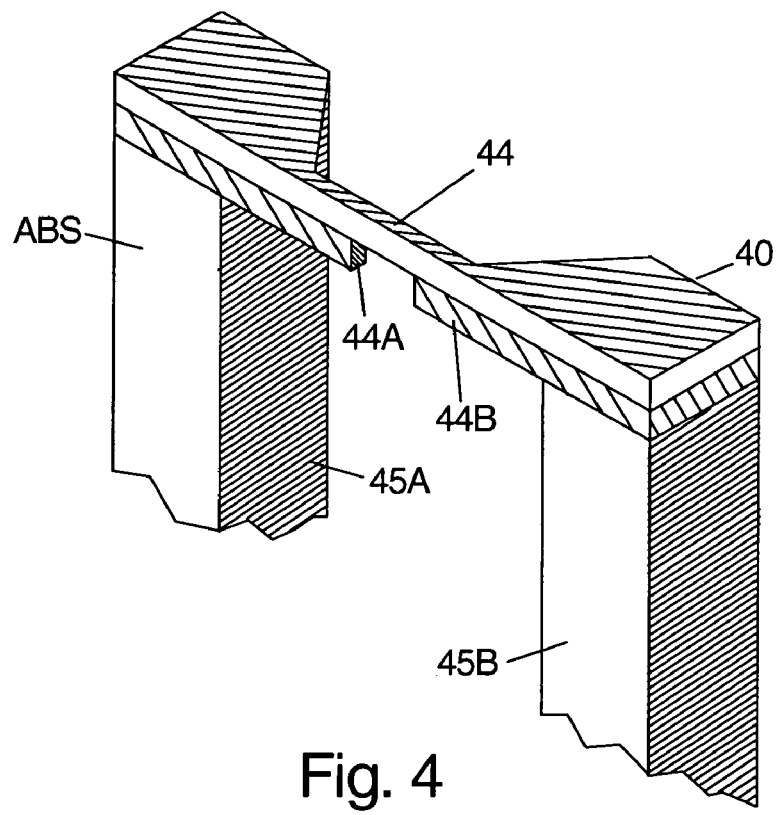
FIG. 4 is an isometric illustration of the trailing shield, side shields and connecting studs used in the first embodiment of the invention.

FIG. 4 is an isometric illustration of the shield structure 40 with trailing shield 44, side shields 44A, 44B and connecting studs 45A, 45B as used in the first embodiment of the invention shown in FIGS. 2 and 3. The connecting studs 45A, 45B have a rectangular cross-section in this embodiment, but no particular shape is required.

Figure 5:
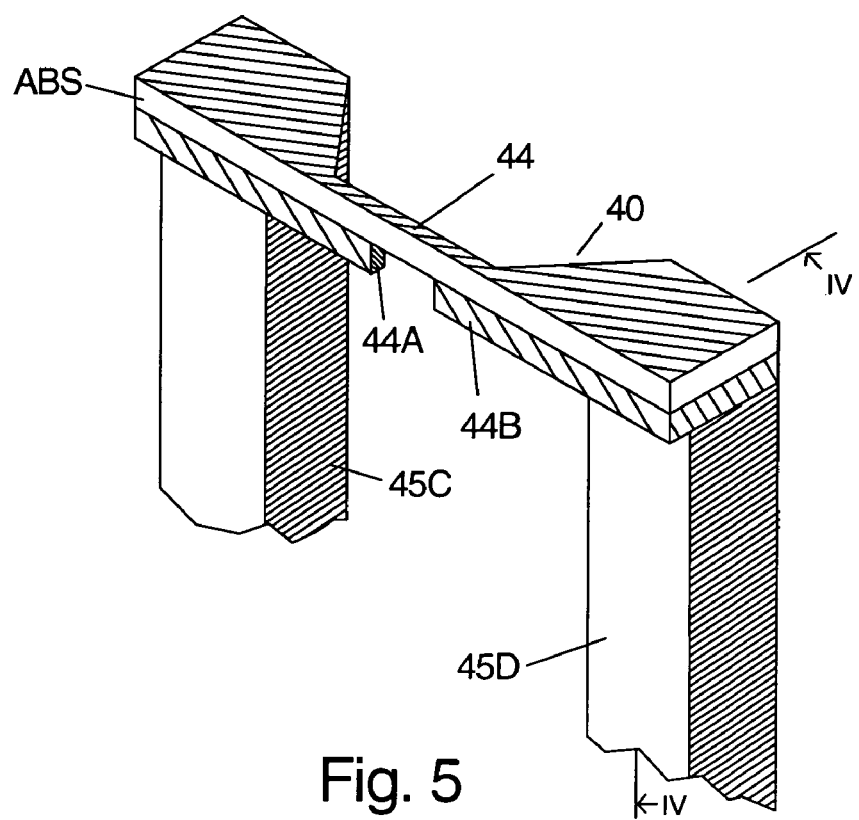
FIG. 5 is an isometric illustration of the trailing shield, side shields and connecting studs used in a second embodiment of the invention in which the connecting studs are recessed from the air-bearing surface.
Figure 6:
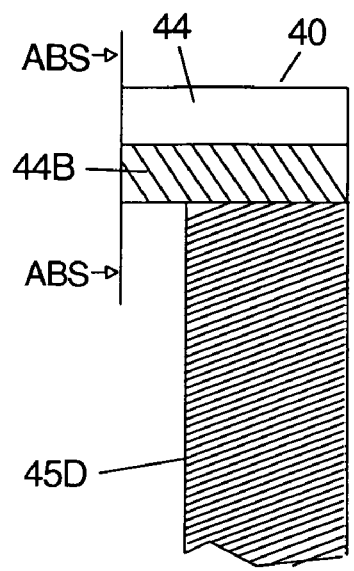
FIG. 6 is a symbolic illustration of the trailing shield, side shields and connecting studs shown in FIG. 5 which corresponds to a section of the taken along line IV in FIG. 5.

FIG. 5 is an isometric illustration of the trailing shield 44, side shields 44A, 44B and connecting studs 45C, 45D used in a second embodiment of the invention. In this embodiment the connecting studs 45C, 45D are recessed from the ABS. FIG. 6 is a symbolic illustration of the trailing shield 44, side shields 44A, 44B and connecting studs 45C, 45D shown in FIG. 5 which corresponds to a section of the taken along line IV in FIG. 5. The area in front of the studs that are recessed from the ABS is filled with a non-magnetic material, so that the ABS remains substantially planar. The stud can be recessed from the ABS to reduce the potential area of metal which can be smeared or corroded during lapping. If the material choice for the studs and the lapping process are compatible, then the first embodiment described in FIG. 4 is acceptable.

Figure 7:
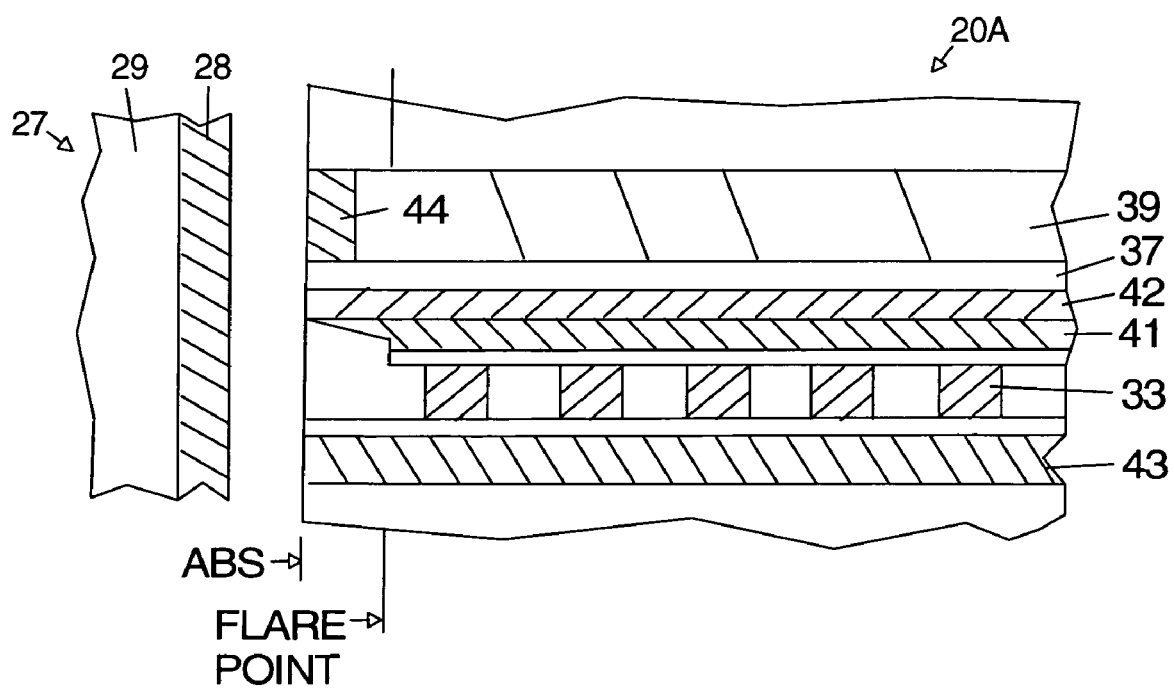
FIG. 7 is a symbolic illustration of a section of the recording head taken along line III in FIG. 2. The recording medium is also shown.

FIG. 7 is a symbolic illustration of a section of the recording head 20A taken along line III in FIG. 2. Line III corresponds to the center of the track of the head. The recording medium 27 is also shown. The area behind the trailing shield is filled with non-magnetic material 39. The gap between the trailing shield and the main pole piece is formed by non-magnetic layer 37. The flux bearing pole piece 41 is in contact with the main pole piece 42, but does not extend to the ABS. The coil 33 is disposed between the return pole piece 43 and the flux bearing pole piece 41. For a typical perpendicular head with a single pole writer and no trailing shield, the flux path at the ABS is from the main pole through the hard ferromagnetic recording layer 28 into the soft underlayer 29 of the medium and back through the recording layer to the return pole piece 43. In a head designed according to the invention the main flux path returns to the trailing shield 44 and the side shields 44A, 44B which are closer to the main pole piece 42. The trailing shield design achieves a better write field gradient and lower media noise. Three critical parameters in this design are 1) the gaps between the main pole piece and the shields; 2) the ABS to soft underlayer 29 spacing, and 3) the thickness of the shields. The ABS to soft underlayer spacing is not a feature of the recording head, but rather is determined by the design of the storage device in which the head is to be employed.

The improvements of the single pole trailing shield (SPT) design of the invention over the single pole (SP) design can be explained by Stoner-Wohlfarth model. For a distribution of grain angles, increasing the angle between H and the mean grain angle can decrease the distribution of switching fields by ½ thus increasing the effective field by 2× and decreasing jitter.

The optimal field angle is achieved in the design when the distance from the ABS to the soft underlayer 29 is equal to the length of the write gap (the distance between the edge of the trailing shield 44 and the main pole piece 42). The write field is decreased as the trailing shield 44 is brought closer to the main pole piece 42 because part of the flux is increasingly shared between the soft underlayer 29 of the media and the trailing shield 44. This problem is ameliorated by increasing the thickness of the trailing shield and bringing the flare point of the main pole piece 42 closer to the ABS. The advantages of this head design are as follows:
1) Increased dH/dX
2) Reduced partial erasure
3) Improved saturation
4) Reduced media noise
5) Tilt field eases writing on S-W media.

To minimize write flux loss and still achieve the desired effect, the trailing and side shield thickness (from the ABS into the head) near the tip of the main pole piece 42 should be roughly equal to half the track-width of the main pole piece 42. In the cross-track direction, the side gaps should be in the range of 1 to 2 times the head-to-underlayer spacing with a preferred value being 1.5 times the design point for the head-underlayer spacing. Larger side gap distances provide little reduction of writing on the adjacent tracks; smaller side gap distances reduce the available write flux excessively.

Optionally the thickness of the shield perpendicular to the ABS may be increased for distances greater than about 1 micron from the center of the main pole piece (track) to improve mechanical integrity and allow for some non-planarity of lapping, but it is not essential to the working of the invention. For example, the off-center thickness of the trailing and side shields could increase tens of nanometers near the connecting studs.

The invention has been described with respect to particular embodiments, but other uses and applications for the ferromagnetic structure according to the invention will be apparent to those skilled in the art.

The invention claimed is:

1. A thin film magnetic recording head for perpendicular recording comprising:
   a main pole piece that extends to an air-bearing surface;
   a return pole piece that extends to the air-bearing surface;
   a shield structure of ferromagnetic material extending along the air-bearing surface near the main pole piece, the shield structure confronting the main pole piece to form a write gap on an opposite side of the main pole piece from the return pole piece; and
   first and second connecting studs of ferromagnetic material extending from the shield structure to the return pole piece.

2. The thin film magnetic recording head of claim 1 wherein the shield structure includes a trailing shield and left and right side shields.

3. The thin film magnetic recording head of claim 2 wherein the first and second connecting studs are symmetrically disposed on opposite sides of the main pole piece and the minimum distance between the shield structure and the main pole piece is substantially smaller than the minimum distance between the first connecting stud and the main pole piece.

4. The thin film magnetic recording head of claim 3 wherein the shield structure has a first thickness orthogonal to the air-bearing surface near the main pole piece, the main pole piece has a tip at the air-bearing surface and the first thickness is less than a length of the tip.

5. The thin film magnetic recording head of claim 4 wherein the connecting studs have a second thickness orthogonal to the air-bearing surface and the second thickness is greater than the first thickness.

6. The thin film magnetic recording head of claim 1 wherein the shield structure is narrower than the return pole piece in a cross-track direction, the first and second connecting studs are symmetrically disposed on opposite sides of the main pole piece and extend orthogonally from outer edges of the shield structure to contact to the return pole piece.

7. The thin film magnetic recording head of claim 1 wherein the first and second connecting studs are recessed from the air-bearing surface and non-magnetic material separates the connecting studs from the air-bearing surface.

8. A thin film magnetic recording head for perpendicular recording comprising:
   a main pole piece that extends to an air-bearing surface;
   a return pole piece that extends to the air-bearing surface;
   a shield structure of ferromagnetic material extending along the air-bearing surface near the main pole piece, the shield structure including a trailing shield and left and right side shields, the trailing shield confronting the main pole piece to form a write gap; and
   first and second connecting studs of ferromagnetic material extending from the shield structure to the return pole piece and being symmetrically disposed on opposite sides of a center line through the main pole piece.

9. The thin film magnetic recording head of claim 8 wherein first and second connecting studs are located away from the main pole piece to reduce the flux flow from the main pole piece to the connecting studs.

10. The thin film magnetic recording head of claim 8 wherein the shield structure has a first thickness orthogonal to the air-bearing surface near the main pole piece, the main pole piece has a tip at the air-bearing surface and the first thickness is less than a length of the tip.

11. The thin film magnetic recording head of claim 10 wherein the connecting studs have a second thickness orthogonal to the air-bearing surface and the second thickness is greater than the first thickness.

12. The thin film magnetic recording head of claim 8 wherein the shield structure is narrower than the return pole piece in a cross-track direction, the first and second connecting studs extend orthogonally from outer edges of the shield structure to contact to the return pole piece at symmetrical positions and the distance between the first and second connecting studs is less than half of a width of the return pole piece a cross-track direction.

13. The thin film magnetic recording head of claim 8 wherein the first and second connecting studs are recessed from the air-bearing surface and non-magnetic material separates the connecting studs from the air-bearing surface.

14. A thin film magnetic recording head for perpendicular recording comprising:
   a main pole piece with a tip that extends to an air-bearing surface;

a return pole piece that extends to the air-bearing surface;
a shield structure of ferromagnetic material extending along the air-bearing surface near the main pole piece tip, the shield structure including a trailing shield and left and right side shields, the trailing shield being disposed on an opposite side of the main pole piece tip from the return pole piece, the trailing shield confronting the main pole piece to form a write gap, the shield structure being narrower than the return pole piece in a cross-track direction and the shield structure having a thickness near the main pole piece tip that is less than a length of main pole piece tip; and
first and second connecting studs of ferromagnetic material extending from first and second outer ends of the shield structure to the return pole piece, being symmetrically disposed on opposite sides of a center line through the main pole piece and having a thickness which is greater than the thickness of the shield structure near the main pole piece tip.

15. The thin film magnetic recording head of claim 14 wherein first and second connecting studs are located away from the main pole piece to reduce the flux flow from the main pole piece to the connecting studs.

16. The thin film magnetic recording head of claim 14 wherein the first and second connecting studs are recessed from the air-bearing surface and non-magnetic material separates the connecting studs from the air-bearing surface.

* * * * *